(12) United States Patent
Fenton et al.

(10) Patent No.: US 6,243,409 B1
(45) Date of Patent: *Jun. 5, 2001

(54) GLOBAL NAVIGATION SATELLITE SYSTEM RECEIVER WITH BLANKED-PRN CODE CORRELATION

(75) Inventors: Patrick C. Fenton, Calgary (CA); Albert J. Van Dierendonck, Los Altos, CA (US)

(73) Assignee: NovAtel, Inc., Calgary (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/892,871

(22) Filed: Jul. 15, 1997

(51) Int. Cl.[7] .................................................. H04L 27/30
(52) U.S. Cl. ........................ 375/137; 375/130; 375/145; 375/147; 375/150
(58) Field of Search .................................... 375/343, 130, 375/147, 150, 145, 149, 367, 137; 342/357; 331/11

(56) References Cited

U.S. PATENT DOCUMENTS

| Re. 32,905 | 4/1989 | Baran | 370/320 |
|---|---|---|---|
| 5,390,207 | 2/1995 | Fenton et al. | 375/149 |
| 5,402,441 | 3/1995 | Washizu et al. | 375/150 |
| 5,402,450 | 3/1995 | Lennen | 375/343 |
| 5,438,589 | * 8/1995 | Nakamura | 375/200 |
| 5,499,190 | 3/1996 | Takahashi et al. | 702/71 |
| 5,808,582 | * 9/1998 | Woo | 342/357 |

(List continued on next page.)

FOREIGN PATENT DOCUMENTS

| WO97/06446 | 2/1997 | (WO) . |
|---|---|---|
| WO97/44682 | 11/1997 | (WO) . |

OTHER PUBLICATIONS

Weil, Lawrence R., "GPS Multipath Mitigation by Means of Correlator Reference Waveform Design", Institute of Navigation, Proceedings of the National Technical Meeting, Navigation and Positioning in the Information Age, Jan. 14–16, 1997, pp. 197–206.

(List continued on next page.)

*Primary Examiner*—Stephen Chin
*Assistant Examiner*—Shuwang Liu
(74) *Attorney, Agent, or Firm*—Cesari and McKenna, LLP (57) ABSTRACT

GNSS receiver includes a subsystem that reduces the adverse effects of multipath signals on punctual and early-minus-late correlation measurements by making the correlation measurements using a "blanked-PRN code." The blanked-PRN code is all zeros except for adjacent positive and negative short pulses that occur at every code bit transition in a locally-generated PRN code. Using the blanked-PRN code, the receiver makes non-zero correlation measurements only near the code bit transitions in the local PRN code. If the local PRN code and the PRN code in the received GNSS satellite signal are closely aligned, the non-zero correlation measurements are made at the times of the bit transitions in the received PRN code. The contributions to the correlation measurements of the multipath signals that do not have bit transitions during the adjacent positive and negative pulses in the blanked-PRN code cancel when the correlation measurements are accumulated—since these multipath signals are constant during the pulse times. The GNSS receiver includes blanked-PRN code logic that produces the blanked-PRN code from the locally-generated PRN code. The blanked-PRN code logic thus produces a code that is zero-valued except for the adjacent pulses. Alternatively, the blanked-PRN code logic produces the zero-valued portions of the code by selectively disabling the blanked-code correlators in between the code bit transitions in the local PRN code. The result is the same, namely, a system that produces non-zero correlation measurements near the code bit transitions in the local PRN code.

21 Claims, 6 Drawing Sheets

U.S. PATENT DOCUMENTS

| | | | | |
|---|---|---|---|---|
| 5,809,064 | * | 9/1998 | Fenton et al. | 375/208 |
| 5,850,420 | | 12/1998 | Guillard et al. | 375/150 |
| 5,901,183 | * | 5/1999 | Garin et al. | 375/343 |
| 6,023,489 | * | 2/2000 | Hatch | 375/150 |

OTHER PUBLICATIONS

Van Dierendonck, A.J. and Braasch, Michael S., "Evaluation of GNSS Receiver Correlation Processing Techniques for Multipath and Noise Mitigation", Institute of Navigation, Proceedings of the National Technical Meeting, Navigation and Positioning in the Information Age, Jan. 14–16, 1997, pp. 207–215.

Hatch, Ronald R., Keegan, Richard G, and Stansell, Thomas A., "Leica's Code and Phase Multipath Mitigation Techniques", Institute of Navigation, Proceedings of the National Technical Meeting, Navigation and Positioning in the Information Age, Jan. 14–16, 1997, pp. 217–225.

Garin, Lionel, van Diggelen, Frank, and Rosseau, Jean–Michel, "Strobe & Edge Correlator Multipath Mitigation for Code", Proceedings of the 9th International Technical Meeting of The Satellite Division of the Institute of Navigation, ION GPS–96, Part I of 2, Sep. 17–20, 1996, pp. 657–671.

Marros, Philip G., "Multipath elimination for the low–cost consumer GPS", Proceedings of the 9th International Technical Meeting of The Satellite Division of The Institute of Navigation, ION GPS–96, Part I of 2, Sep. 17–20, 1996, pp. 665–671.

* cited by examiner

GLOBAL NAVIGATION SATELLITE SYSTEM RECEIVER WITH BLANKED-PRN CODE CORRELATION

FIELD OF THE INVENTION

This invention relates generally to global navigation satellite system (GNSS) receivers and more specifically to GNSS receivers that reduce the adverse effects of multipath signals on correlation measurements.

BACKGROUND OF THE INVENTION

A GNSS receiver determines its global position based on the signals it receives from orbiting GPS, GLONASS or other satellites. The signal transmitted by each satellite is comprised of a carrier that is modulated by at least a binary pseudorandom (PRN) code, which consists of a seemingly random sequence of 1s and 0s that periodically repeat. The 1s and 0s in the PRN code are referred to as "code chips," and the transitions in the code from 1 to 0 or 0 to 1, which occur at "code chip times," are referred to as "bit transitions." Each satellite uses a unique PRN code, and thus, a GNSS receiver can associate a received signal with a particular satellite by determining which PRN code is included in the signal.

The GNSS receiver calculates the difference between the time a satellite transmits its signal and the time that the receiver receives the signal. The receiver then calculates its distance, or "pseudorange," from the satellite based on the associated time difference. Using the pseudoranges from at least four satellites, the receiver determines its global position.

To determine the time difference, the GNSS receiver synchronizes a locally-generated PRN code with the PRN code in the received signal by aligning the code chips in each of the codes It then determines how much the locally-generated PRN code is shifted, in time, from the known timing of the satellite PRN code at the time of transmission, and calculates the associated pseudorange. The more closely the GNSS receiver aligns the locally-generated PRN code with the PRN code in the received signal, the more precisely the GNSS receiver can determine the associated time difference and pseudorange and, in turn, its global position.

The code synchronization operations include acquisition of the satellite PRN code and tracking the code. To acquire the PRN code, the GNSS receiver generally makes a series of correlation measurements that are separated in time by a code chip. After acquisition, the GNSS receiver tracks the received code. It generally makes "early-minus-late" correlation measurements, i.e., measurements of the difference between (i) a correlation measurement associated with the PRN code in the received signal and an early version of the localy-generated PRN code, and (ii) a correlation measurement associated with the PRN code in the received signal and a late version of the local PRN code. The GNSS receiver then uses the early-minus-late measurements in a delay lock loop (DLL), which produces an error signal that is proportional to the misalignment between the local and the received PRN codes. The error signal is used, in turn, to control the PRN code generator, which shifts the local PRN code essentially to minimize the DLL error signal.

The GNSS receiver also typically aligns the satellite carrier with a local carrier using correlation measurements associated with a punctual version of the local PRN code. To do this the receiver uses a carrier tracking loop.

A GNSS receiver receives not only line-of-sight, or direct path, satellite signals but also multipath signals, which are signals that travel along different paths and are reflected to the receiver from the ground, bodies of water, nearby buildings, etc. The multipath signals arrive at the GNSS receiver after the direct-path signal and combine with the direct-path signal to produce a distorted received signal. This distortion of the received signal adversely affects code synchronization operations because the correlation measurements, which measure the correlation between the local PRN code and the received signal, are based on the entire received signal—including the multipath components thereof. The distortion may be such that the GNSS receiver attempts to synchronize to a multipath signal instead of to the direct-path signal. This is particularly true for multipath signals that have code bit transitions that occur close to the times at which code bit transitions occur in the direct path signal.

One way to more accurately synchronize the received and the locally-generated PRN codes is to use narrowly spaced correlators for code tracking. The use of the "narrow correlators" is discussed in U.S. Pat. Nos. 5,101,416; 5,390,207 and 5,495,499, all of which are assigned to a common assignee and incorporated herein by reference. It has been determined that the adverse effects of multipath signal distortion on the early-minus-late measurements is substantially reduced by narrowing the delay spacing between the early and late versions of the PRN code. The delay spacing is narrowed such that the noise correlates in the early and late correlation measurements The narrow correlators are essentially spaced closer to a correlation peak that is associated with the punctual PRN code correlation measurements than the contributions of many of the multipath signals. Accordingly, the early-minus-late correlation measurements made by these correlators are significantly less distorted than they would be if they were made at a greater interval around the peak. The closer the correlators are placed to the correlation peak, the more the adverse effects of the multipath signals on the correlation measurements are minimized. The delay spacing can not, however, be made so narrow that the DLL can not lock to the satellite PRN code and then maintain code lock. Otherwise, the receiver cannot track the PRN code in the received signal without repeatedly taking the time to re-lock to the code.

SUMMARY OF THE INVENTION

A GNSS receiver incorporating the invention further minimizes the adverse effects of the multipath signals on the early-minus-late correlation measurements, as well as on the punctual correlation measurements, by using a "blanked-PRN code." The blanked-PRN code is all zeros except for adjacent short pulses that occur at every code bit transition in the local PRN code. This means that only the correlation measurements that are made near the bit transitions in the local PRN code are non-zero.

If the local PRN code and the PRN code in the received signal are closely aligned, the non-zero correlation measurements are made at the times of the bit transitions in the received PRN code. Thus, transitions in the received signal that are associated with the multipath signals do not contribute at all to the accumulated correlation measurements, unless they occur during the times of the short pulses in the blanked-PRN code. Accordingly, the blanked-code correlation measurements for the direct path signals will materially exceed those of the multipath signals, and the GNSS receiver will more closely align its local PRN code with the direct path signal.

More specifically, the blanked-PRN code includes, at the times of the bit transitions in the local PRN code, adjacent positive and negative pulse. The two pulses, each of which is a small fraction of a code chip, occur on opposite sides of the bit transition, with the transition between the two pulses occurring at the same time as the bit transition in the local PRN code. The adjacent pulses thus occur in different chip times. Accordingly, the non-zero correlation measurements are made only for a small fraction of a chip time, which is preferably a fraction of the delay spacing associated with the narrow correlators. The blanked-code correlation is used once the code tracking delay locked loop, which uses the correlation measurements from the narrow correlators, is locked to the received code. Thus, the blanked-code correlation can use the narrower code pulses without suffering the consequences that are associated with using too narrow a delay spacing for the narrow correlators.

The invention can be used in any GNSS receiver, such as a receiver that uses signals produced by GPS or GLONASS satellites. Accordingly, the invention relates to GNSS receivers, which include GPS and GLONASS receivers.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
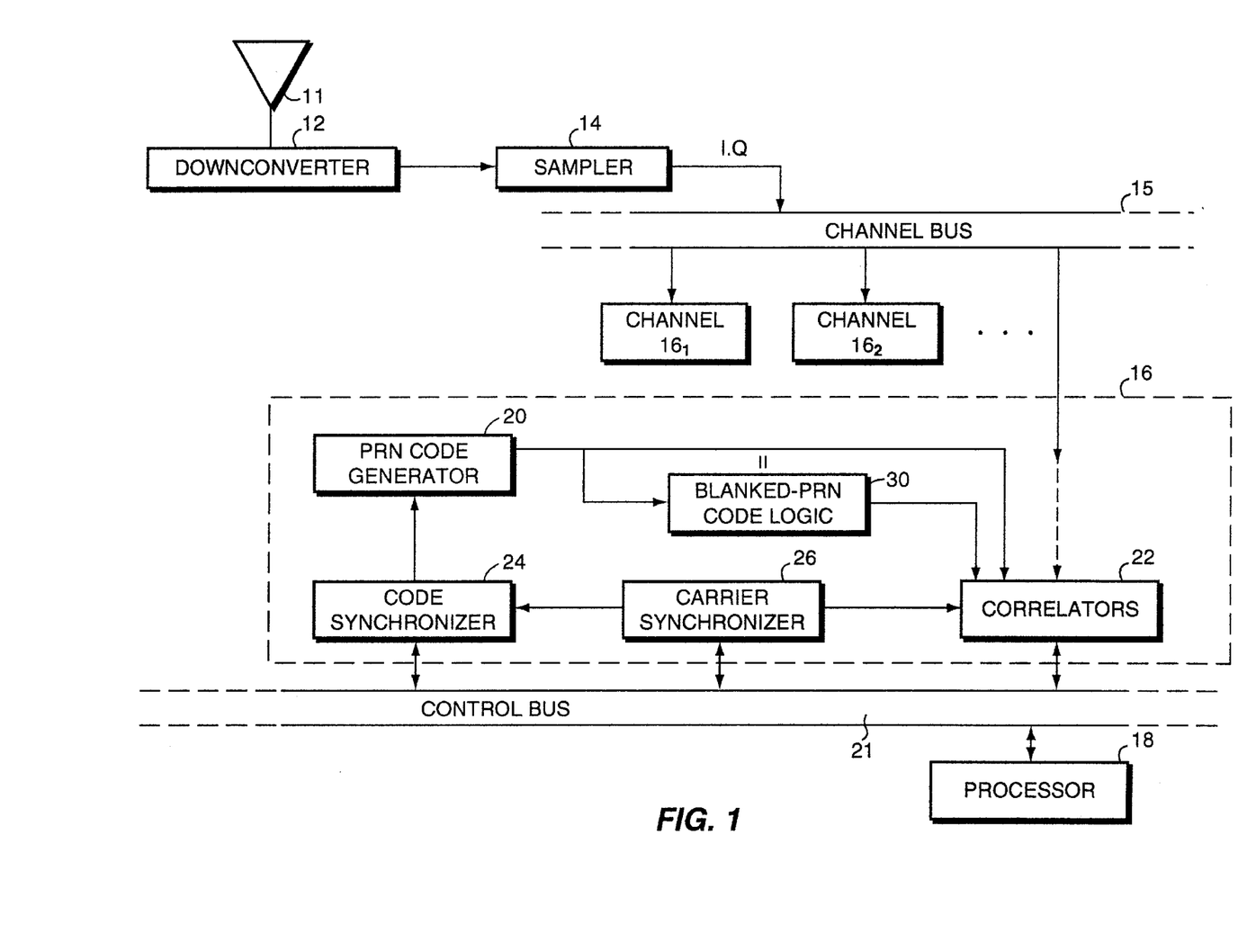
FIG. 1 is a functional block diagram of a GNSS receiver constructed in accordance with the invention.

Referring to FIG. 1, a GNSS receiver 10 receives satellite signals over an antenna 11, downconverts the signals in a downconverter 12 and samples the signals in a sampler 14 to produce I and Q signal samples in a known manner. The I and Q signal samples are supplied over a channel bus 15 to channels $16_1$, $16_2$ . . . , each of which is identical except for the use of a different PRN code for each channel. The channels are hereinafter collectively referred to by the reference numeral 16.

Each channel 16 includes a PRN code generator 20 that produces the local PRN code, and complex correlators 22 that each make I and Q correlation measurements to determine the correlation between the local PRN code and the received signal. The correlators 22 make the correlation measurements by multiplying the I and Q samples by early, punctual and/or late versions of the local PRN code and early, punctual and/or late versions of a "blanked-PRN code," which is produced by the blanked-PRN code logic 30. The blanked-PRN code is discussed below with reference to FIG. 3, and the operations of the blanked-PRN code logic 30 and the correlators 22 that use the blanked-PRN code are discussed in more detail below with reference to FIGS. 4–5. The operations of the correlators 22 that use the local PRN code are discussed below with reference to FIG. 2.

The blanked-PRN code is used during signal tracking operations, to track the received PRN code and carrier. These operations occur after the GNSS receiver 10 has performed its signal acquisition operations in a known manner, as discussed in U.S. Pat. Nos. 5,101,416; 5,390,207 and 5,495,499 which are incorporated herein by reference. We discuss below the relevant operations of the GNSS receiver 10 in tracking the received code and carrier, without reference to the signal acquisition operations. Further, we make no reference herein to the code or carrier tracking operations that are unchanged by the use of the blanked-PRN code. For example, we do not discuss how the receiver determines the degree of doppler shift, or how it uses such information during carrier tracking operations. These carrier and code tracking operations, like the signal acquisition operations, are well known to those skilled in the art Further, such carrier and code tracking operations are discussed in the above-referenced patents.

Referring still to FIG. 1, in each channel 16 the PRN code generator 20 is controlled by a code synchronizer 24, which directs the PRN code generator to shift the local PRN code in time. The code synchronizer 24 is, in turn, controlled by a microprocessor 18 that receives the correlation measurements over a control bus 21. The microprocessor 18 uses the correlation measurements in a delay locked loop (DLL) that the processor operates for the channel. The DLL produces, in a known manner, a code-tracking error signal that the code synchronizer uses to direct the PRN code generator 20 to shift the local PRN code. The code synchronizer essentially directs the PRN code generator to shift the local PRN code so as to minimize the code-tracking error signal.

A carrier synchronizer 26 operating in a known manner aligns a locally-generated carrier to the satellite carrier. The carrier synchronizer 26 is controlled by the microprocessor 18, which produces a carrier phase error signal based on the correlation measurements associated with the punctual version of the local PRN code. The carrier synchronizer then controls the angle by which the I and Q signal samples are rotated by the correlators 22, to reduce the carrier phase error and remove the satellite carrier from the samples. The carrier synchronizer 26 also in a known manner provides information to the code synchronizer 24 for carrier-aiding the tracking of the received PRN code.

Based in part on the calculated carrier phase and the timing of the local PRN code, the microprocessor 18 performs the pseudorange calculations and determines the global position of the receiver, all in a known manner.

Figure 2:
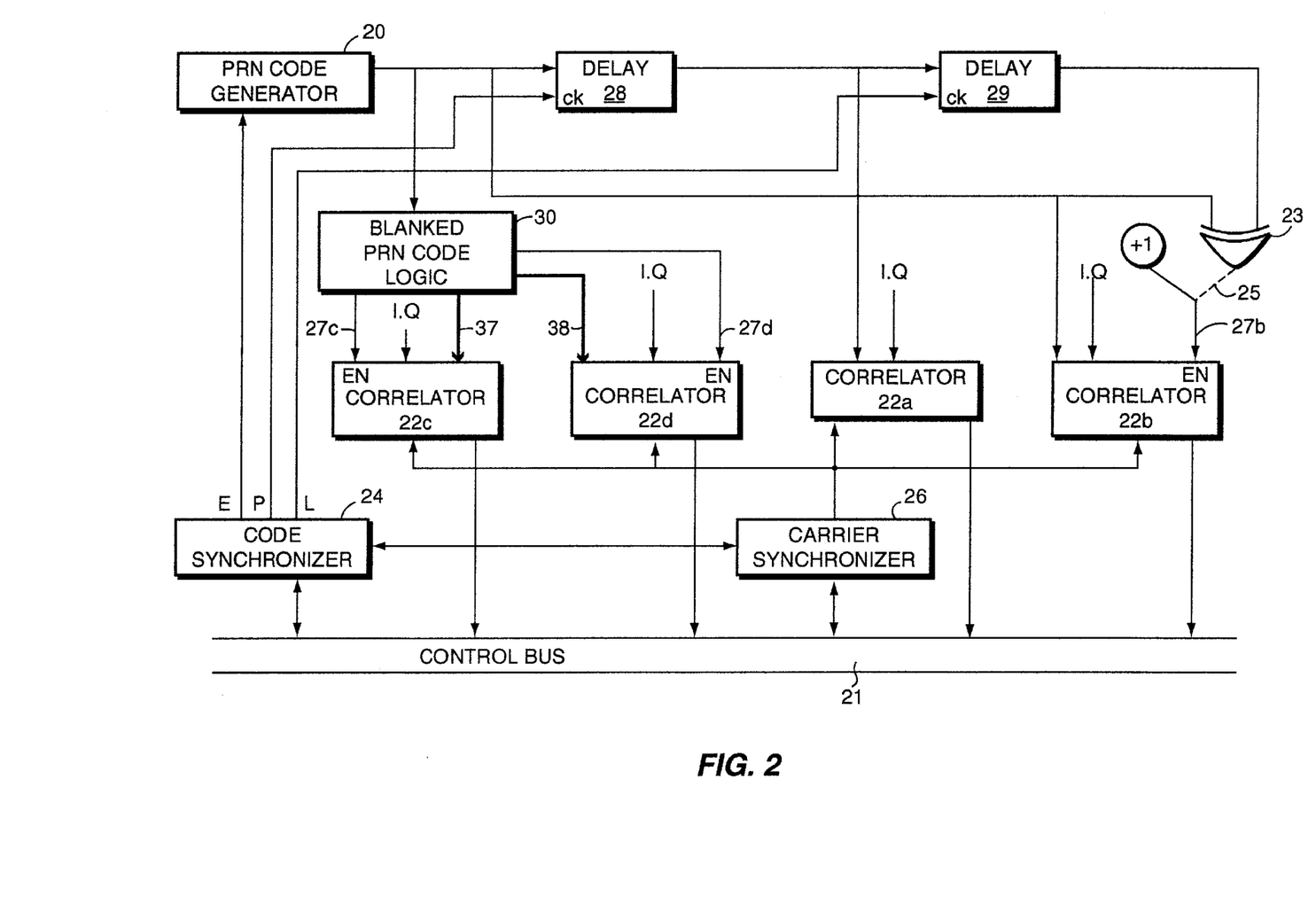
FIG. 2 is a functional block diagram of the PRN code correlation system included in the receiver of FIG. 1.

Referring now to FIG. 2, the code synchronizer 24 sends early, punctual and late clock signals to the PRN code generator 20 and delays 28 and 29, respectively. The PRN code generator 20 produces the early version of the PRN code. The delay 28 produces the punctual version of the PRN code, in response to the receipt of the early version of the code from the PRN code generator 20 and the punctual clock signal from the code synchronizer 24. Similarly, the delay 29 produces the late version of the PRN code, in response to the receipt of the punctual version of the code from the delay 28 and the late clock signal from the code synchronizer 24.

The complex correlator 22a receives the punctual version of the PRN code and the I and Q samples of the received signal, as well as carrier angle information from the carrier synchronizer 24. It then multiplies the signal samples by the code, after the signal samples have been rotated by the carrier angle, to remove the carrier. Alternatively, the correlator 22a removes the carrier after the PRN code multiplication. The results of the rotation and multiplication operations, i.e., the punctual correlation measurements, are accumulated for a predetermined time before they are sent to the microprocessor 18 over control bus 21. The microprocessor 18 uses the correlation measurements in a phase locked loop, to determine a carrier phase error and sends to the carrier synchronizer 26 signals associated with the error signal. The carrier synchronizer 26 then adjusts the angle by which it directs the correlators 22a–b to rotate the I and Q samples.

The complex correlator 22b is configured to perform in either of two modes, namely, a signal acquisition mode and a signal tracking mode, as is discussed in more detail in the above-referenced patents. In the signal acquisition mode, a switch 25 is set to a first position in which it continuously asserts an enable line 27b, and thus, continuously enables the correlator 22b. In this mode, the correlator 22b makes correlation measurements associated with the early version of the local PRN code. After the signal is acquired, the switch 25 is set in a second position in which the enable line 27b is selectively asserted by an XOR gate 23. In this second, or signal tracking, mode the correlator 22b produces early-minus-late correlation measurements that are used in code tracking operations. The XOR gate 23 asserts the enable line when the early and late versions of the PRN codes differ, and de-asserts the enable line when the two versions are the same. The correlation measurements produced by the correlator 22b are the same as those produced by subtracting correlation measurements produced by separate early and late correlators.

When the correlator 22b is enabled it rotates the received signal samples to remove the carrier and multiplies the rotated samples by the early version of the PRN code. Alternatively, the correlator 22b may instead multiply the samples by the late version of the code. Further, the correlator 22b may rotate the samples to remove the carrier after the multiplication operation. The correlator 22b next accumulates the results of the multiplication and rotation operations, that is, it accumulates the early-minus-late correlation measurements. It then, after a predetermined period of time, forwards the accumulated measurements to the microprocessor 18 over the control bus 21. The microprocessor then uses the correlation measurements in its DLL processing operations.

At the start of the code tracking operations, the code synchronizer 24 adjusts the delay spacing between the early, punctual and late versions of the PRN code by adjusting the timing of the early, punctual and late clock signals. The delay spacing is set to one code chip for signal acquisition and narrowed to a fraction of a code chip for code trackin, as discussed in the above-referenced patents. The correlator (s) that are operating with the early and late versions of the PRN code that are separated in time by the narrowed delay spacing are what is referred to in the GNSS industry as the "narrow correlators."

As discussed above, the early-minus-late correlation measurements produced by the correlator 22b are used by the microprocessor 18 in the DLL processing operations that control the operations of the code synchronizer 24 immediately after the satellite signal has been acquired. Accordingly, the delay spacing associated with these correlators, that is, the narrowed delay spacing, should not be made too narrow, to ensure that the DLL locks to the received code. This is particularly true for GNSS receivers that are stationed in moving vehicles, such as automobiles, planes and so forth. The limit of the delay spacing is ultimately controlled by the front-end or RF bandwidth of the receiver. Using a wider bandwidth, the delay spacing can be made narrower, as discussed in the above-referenced patents. It is our experience that with a front-end bandwidth of 10 MHz, the delay spacing can be narrowed to approximately one tenth of a code chip.

In addition to the correlators 22a–b that produce the code tracking correlation measurements, the receiver 10 uses punctual and early-minus-late "blanked-code" complex correlators 22c and 22d, to make correlation measurements using early, punctual and late versions of a blanked-PRN code. These blanked-code correlators correlate the I and Q signal samples with a code that is all-zeros except for a fraction of a code chip that corresponds to the times of the bit transitions in the local PRN code, as discussed below with reference to FIGS. 3–4.

Using the blanked-PRN code eliminates contributions to the accumulated punctual and early-minus-late correction measurements for all of the multipath signals, except those that have bit transitions that correspond in time to the non-zero portions of the blanked-PRN code. The contributions to the correlation measurements made by the multipath signals that do not have transitions at the times of the blanked-code pulses cancel when the non-zero correlation measurements are accumulated. Specifically, these multipath signals are essentially constant during the times of the adjacent positive and negative pulses in the blanked code. To take the correlation measurements, the signals are multiplied by the positive (+1) and the negative (−1) code values associated with the adjacent code pulses. When the results are accumulated, or summed, the contributions of the multipath signals cancel.

Figure 3:
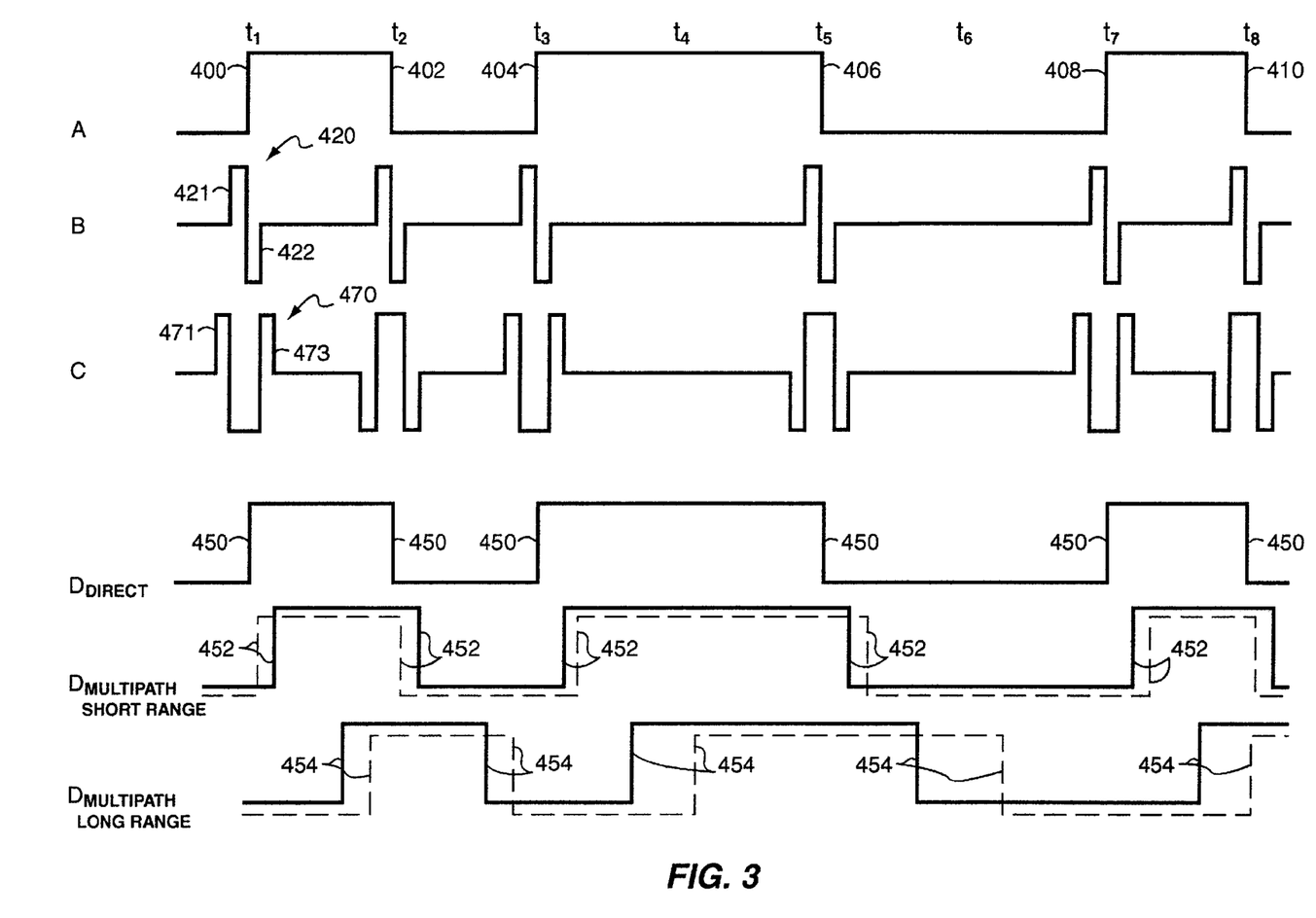
FIG. 3 is a chart of a PRN code and associated versions of blanked-PRN codes.

Referring now to FIG. 3, we explain the theory behind the use of the blanked-PRN code. We then explain with reference to FIGS. 4 and 5 how the GNSS receiver 10 takes advantage of blanked-PRN code correlation.

Referring now to FIG. 3, the local PRN code is denoted by A, the blanked-PRN code is denoted by B, the early-minus-late version of the blanked-PRN code is denoted by C and the received satellite signal is denoted by D. As shown, the local PRN code makes a positive bit transition 400 to +1 at code chip time $t_1$, followed by a negative bit transition 402 to −1 at code chip time $t_2$ and a positive bit transition 404 to +1 at code chip time $t_3$. At code chip time $t_4$ there is no bit transition in the code. At code chip time $t_5$ the local PRN code makes a negative bit transition 406 from 1 to −1, stays at −1 through code chip time $t_6$ and then makes a positive bit transition 408 from −1 to 1 at time $t_7$, and a negative transition 410 at code chip time $t_8$.

The blanked-PRN code is zero-valued between bit transitions in the local PRN code, and includes at the times of the bit transitions in the local PRN code coupled short pulses 420. The pulses 420 include a first pulse 421 that precedes the bit transition in the local PRN code and a second pulse 422 that follows the bit transition. As shown in the drawing, the blanked-PRN code includes at the times of each positive bit transition 400, 404, and 408 a positive first pulse 421 followed by a negative second pulse 422, and at the times of each negative bit transition 402, 406 a negative first pulse 421 followed by a positive second pulse 422.

The blanked-PRN code may instead include a negative first pulse and a positive second pulse at the positive bit transitions in the local PRN code, as long as the opposite polarity pulses occur at the negative bit transitions. The effect of using these different polarity pulses is a sign change in the slope of an associated discriminator curve.

The received satellite signal includes, in the direct-path contribution to the signal, code bit transitions 450. As discussed above, the local PRN code is tracking the direct-path PRN code using the narrow correlators, and thus, the bit transitions 400–408 in the local PRN code occur close to the bit transitions 450 in the direct-path PRN code. The received signal also includes multipath signal contributions, which have bit transitions 452 and 454. The received signal is thus a combination of the signals labeled $D_{DIRECT-PATH}$ and $D_{MULTIPATH}$ in FIG. 3.

To determine the correlation between the received satellite signal and the blanked-PRN code, the correlators 22c–d multiply the satellite signal, or more precisely samples of that signal, by the blanked-PRN code. Accordingly, when the multiplication involves the zero-valued portion of the blanked-PRN code, the correlation measurements are all zeros, and thus, they do not contribute to the accumulated correlation measurements.

The bit transitions 450 in the direct path signal occur close to the bit transitions 400–408 in the local PRN code. The edges of the bit transitions 450 thus occur at times that correspond to the pulses 420 in the blanked-PRN code. Accordingly, the blanked-code correlators 22c–d make non-zero correlation measurements associated with these bit transitions 450. These non-zero correlation measurements contribute to the accumulated correlation measurements that are passed to the code and carrier synchronizers.

The bit transitions 452 in the received signal that are associated with short-range multipath signals, and the bit transitions 454 are associated with long-range multipath signals. The blanked-code correlators 22c–d make zero-valued correlation measurements associated with the bit transitions 452 and 454 that occur during the zero-valued portions of the blanked-PRN code. Further, the contributions of these multipath signals to the non-zero correlation measurements cancel if no bit transitions 452 or 454 occur during the non-zero portion of the blanked-PRN code. The contributions from the multipath signals, which are constant throughout the duration of the pulses, cancel because the same value is multiplied by, for example, a first positive pulse in the blanked-PRN code and an adjacent pulse in the blanked-PRN code. When these products are accumulated, the portions of the correlation measurements attributable to the multipath signals add to zero. The portions of the correlation measurements attributable to signals with bit transitions that occur during the pulse times do not, however, accumulate to zero. Accordingly, the multipath signals with bit transitions that occur during the pulse times do contribute to the correlation measurements.

As long as at least some of the bit transitions in the multipath signals occur before pulse 421 or after pulse 422, the blanked-code correlators 22c–d produce accumulated correlation measurements for multipath signals that are lower than those associated with the direct-path signal. For the direct path signal, the correlators accumulate non-zero correlation measurements in which the contributions of the signal do not cancel. For the multipath signals, the correlators accumulate non-zero correlation measurements in which the contributions from all of the multipath signals except those with bit transitions that occur during the code pulses cancel. Accordingly, the receiver will not track the multipath signals that have bit transitions that occur at times other than the times of the short adjacent pulses.

The early-minus-late blanked-PRN code is a combination of an early blanked-PRN code and a negated late blanked-PRN code. It is zero-valued between bit transitions in the local PRN code and includes at each bit transition in the local PRN code a series of three pulses 470. For positive bit transitions in the local PRN code, the early-minus-late blanked-PRN code includes (i) a positive first pulse 471 that precedes the positive pulse 421 in the blanked-PRN code, (ii) a negative second pulse 472 that is twice as long as the positive first pulse and corresponds in time to the coupled pulses 420 in the blanked-PRN code, and (iii) a positive third pulse 473 that follows the negative pulse 422 in the blanked-PRN code. For negative bit transitions in the local PRN code, the polarities of the pulses 471–473 are the opposite of those of the pulses 470 associated with the positive bit transitions.

The polarities of the series of pulses 470 may be reversed, such that, for example, the pulses associated with a positive bit transition in the local PRN code consist of a negative first pulse, a positive second pulse and a negative third pulse. As discussed above with respect to the blanked-PRN code, the consequence of reversing the polarities of the pulses is a sign change in the slope of an associated discriminator curve.

Figure 4:
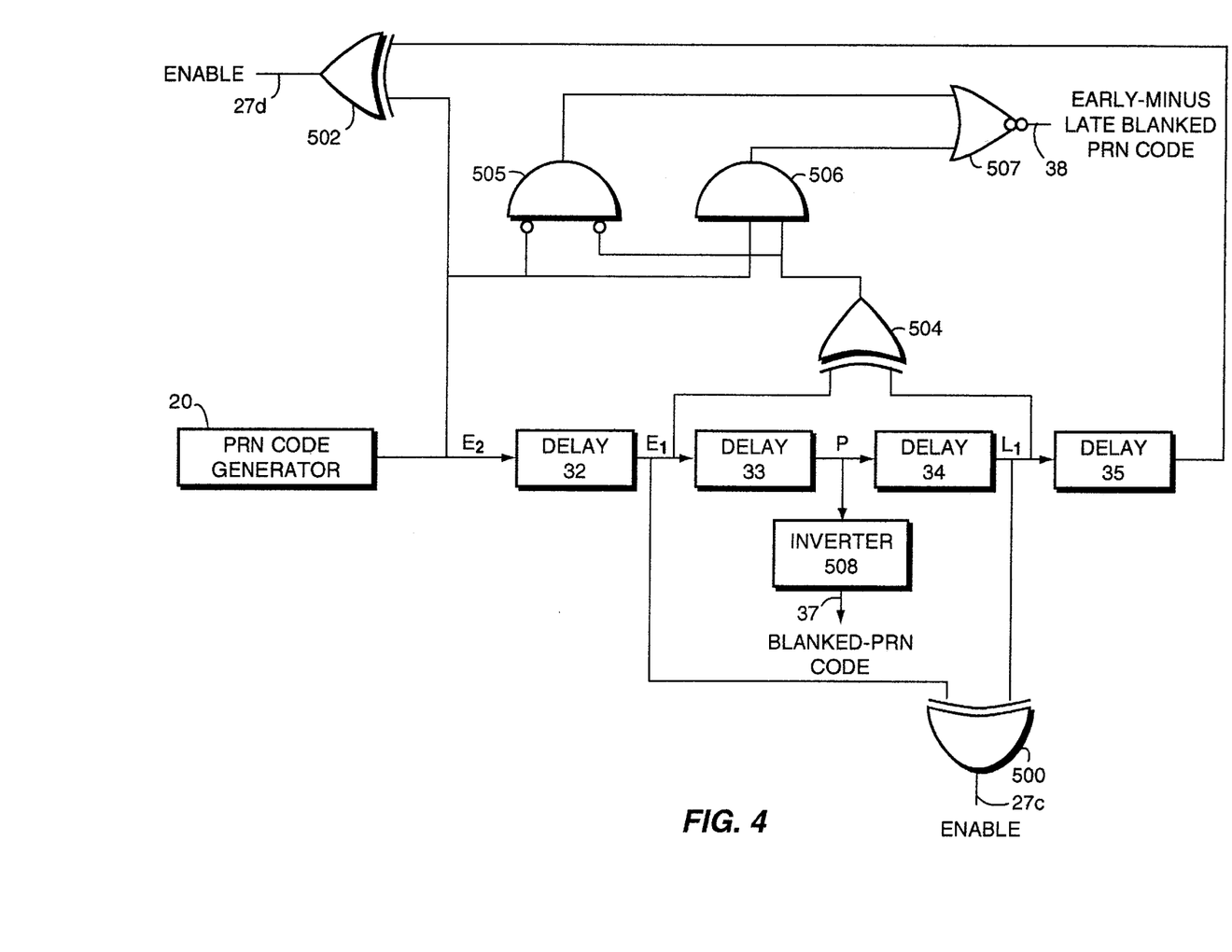
FIG. 4 is a functional block diagram of blanked-PRN code logic that is included in the GNSS receiver of FIG. 1.

Referring also to FIG. 4, the blanked-PRN code logic 30 includes four delays 32–35, namely, two early delays 32–33 and two late delays 34–35. The PRN code generator 20 produces the earliest version of the local PRN code, labeled E2 in the drawing. After passing through delay 32, an early version of the local PRN code is produced that is closer in time to the punctual PRN code. This early version of the code is labeled E1 in the drawing. The delay 33 produces the punctual version of the local PRN code, which corresponds to the punctual version of the code produced by delay 28 (FIG. 2). The delay 34 produces a late version of the code, which is labeled L1 in the drawing. A later version of the code, which is labeled L2, is produced by the delay 35. The delays 32–35 are spaced from one another by a time Δ, which is also the duration of the short pulse 421 or 422. The earliest and latest delays 32 and 35 are preferably spaced by a fraction of a code chip that is less than the delay spacing associated with the narrow correlators 22a–b (FIG. 2).

The blanked-PRN code logic 30 includes two XOR gates 500 and 502, respectively, that control the enable lines 27c and 27d of the blanked-code correlators 22c and 22d. The correlators 22c–d are disabled during the zero-valued portions of the associated punctual and early-minus-late blanked-PRN codes and enabled, respectively, during the pulses 420 or 470. This produces the same result as multiplying the I and Q samples of the satellite signal by the zero-valued and non-zero valued portions of the codes, namely, making no changes or contributions to the accumulated correlation measurements during the zero-value portions of the blanked-PRN code and making contributions during the non-zero valued portions of the code.

The XOR gates 500 and 502 work in conjunction with the gates 504–507 and inverter 508 to produce at the correlators 22c–d the pulses 420 and 470. Since the correlators do not respond to the code signals they receive while they are disabled, the gates 504–507 need not and indeed do not produce zero-valued signals for the periods during which the correlators are disabled. Alternatively, the blanked-PRN code logic 30 could permanently enable the correlators 22c–d, and produce directly the non-zero and zero-valued portions of the blanked codes.

Figure 5:
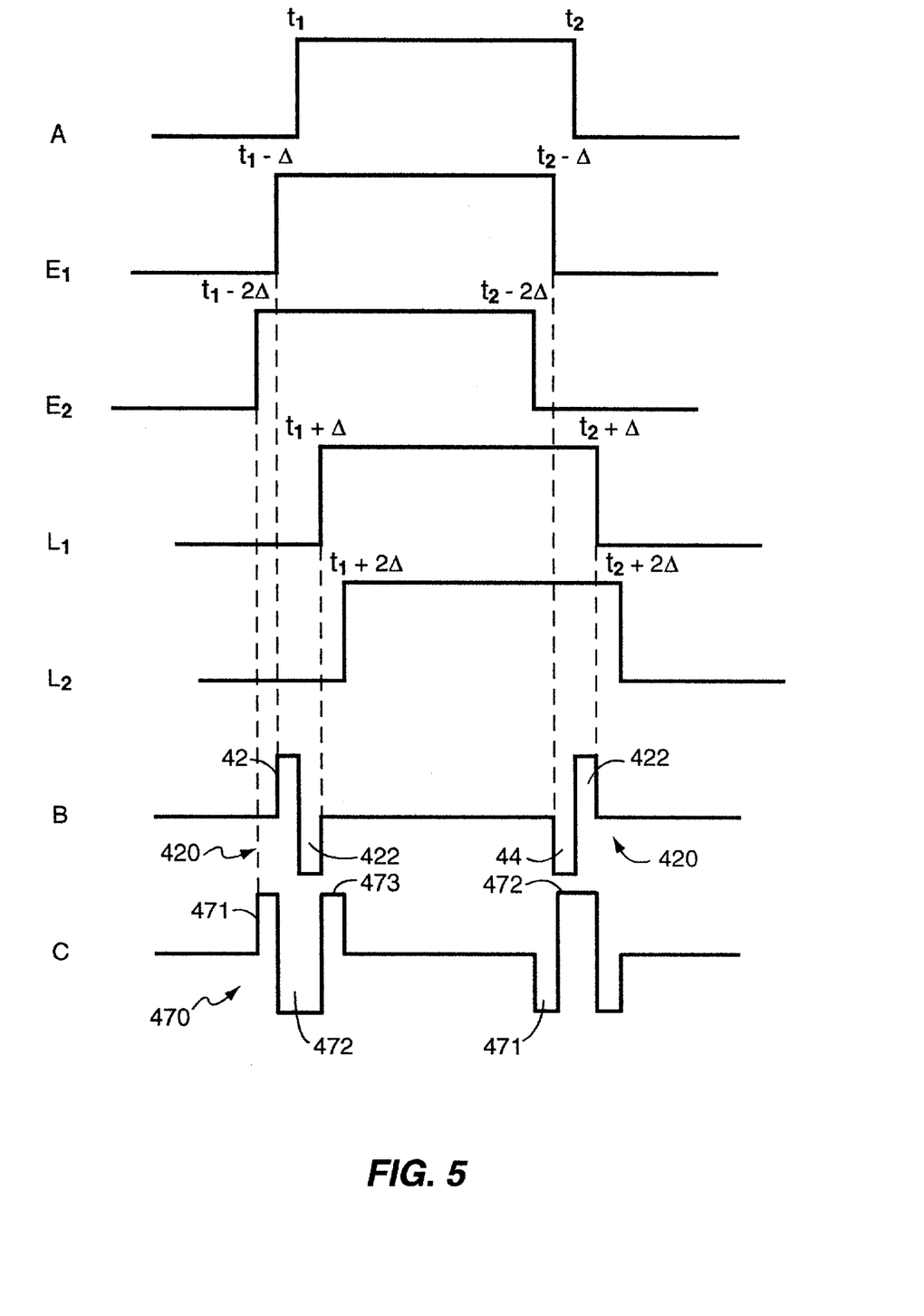
FIG. 5 is a timing diagram associated with the components of the blanked-PRN code logic of FIG. 4.

The blanked-PRN code, labeled B in FIGS. 3 and 5, is produced at the correlator 22c by enabling the correlator whenever the versions E1 and L1 of the local PRN code differ. These versions differ whenever there is about to be a bit transition in the punctual version of the local PRN code.

Referring now also to FIG. 5, the E1 code goes from low to high at time $t_1-\Delta$, which is just before the punctual PRN code makes the positive bit transition 400 at time $t_1$. At this time $t_1-\Delta$, the XOR gate 500 asserts line 27$c$, to enable the correlator 22$c$. The local punctual PRN code is low at this time and an inverter 508, which produces the blanked-PRN code on line 37, produces a high signal. At time $t_1$, the punctual version of the PRN code makes a positive transition and the signal produced by the inverter 508 transitions to low. The inverter 508 has thus far produced on line 37 the positive first pulse 421 and a transition to the negative second pulse 422.

Continuing for a time $\Delta$ through the delay 34, the inverter 508 produces the low signal and the XOR gate 500 holds the enable line 27$c$ high. At time $t_1+\Delta$, the L1 version of the local PRN code makes a positive transition and the XOR gate 500, which now receives two positive signals de-asserts line 27$c$ and disables the correlator 22$c$. This produces at the correlator 22$c$ the transition to zero that ends the pulse 422. The XOR gate 500 then continues to hold the line 27$c$ low until the E1 signal transitions from high to low at a time $t_j-\Delta$, which is just before a next bit transition in the punctual version of the local PRN code occurs at time $t_j$. The inverter 508 produces a non-zero signal when the correlator 22$c$ is disabled. However, since the correlator 22$c$ does not, when it is disabled respond to the inverter output signal, that signal is in effect zero-valued at the correlator.

When the correlator 22$c$ is enabled, it responds to the first and second pulses 421 and 422 by producing non-zero correlation measurements. It thus multiplies the I and Q samples of the received signal by $\pm 1$, depending on the polarity of the individual pulses 421 and 422, and accumulates the results. The correlator 22$c$ is disabled at all other times, and thus, does not during these times make any contributions to the accumulated correlation measurements. This is the same result that would occur if the correlator instead multiplied the I and Q samples by both the non-zero and the zero-valued portions of the blanked-PRN code and accumulated correlation measurements.

The early-minus-late blanked-PRN code, which is denoted C in the FIGS. 3 and 5, is produced at correlator 22$d$ by XOR gate 502 and NOR gate 507. Whenever the E2 and L2 versions of the local PRN code differ, the XOR gate 502 asserts the line 27$d$, and thus, enables the correlator 22$d$. This occurs at a time $t_j-2\Delta$, which is a time $2\Delta$ before a bit transition in the punctual version of the PRN code, for example, at time $t_1$.

When the XOR gate 502 produces the high signal at time $t_1-2\Delta$, E2 is high and E1, L1 and L2 are all low. The XOR gate 504, which receives the E1 and L1 versions of the code, produces a low signal that is applied to one input of the AND gate 506. The AND gate 506 also receives the E2 version of the code, and produces a low signal in response to the high E2 signal and the low signal from the XOR gate 504. The AND gate 505 similarly produces a low signal in response to receiving inverted versions of the E2 signal and the signal from the XOR gate 504. The NOR gate 507 receives these two low signals and produces on line 38 a high output signal, which is the start of the positive first pulse 471 in the early-minus-late blanked-PRN code.

The XOR gate 504 continues to produce a low signal until the E1 version of the local PRN code goes high at a time $t_1-\Delta$. At this time the XOR gate 504 produces a high signal and AND gates 505 and 506 produce, respectively, high and low signals. The NOR gate 507 responds to the signals produced by the AND gates by producing on line 38 a low signal, which is the transition between the positive first pulse 471 and the negative second pulse 472. The gates 504–507 continue to produce the same signals for a period of $2\Delta$, until the L1 version of the code makes a positive transition. When this occurs at time $t_1+\Delta$, the XOR gate 504 produces a low signal and the AND gates 505 and 506 each produce low signals. The NOR gate 507 then produces a high output signal, which is the transition from the second pulse 472 to the third pulse 473.

At a time $\Delta$ later, i.e., at time $t_1+2\Delta$, the L2 signal goes high, and the XOR gate 502 de-asserts line 27$d$ and disables the correlator 22$d$. This produces at the correlator the transition to the zero-valued portion of the early-minus-late blanked-PRN code that follows the pulse 473. The XOR gate 502 then keeps the correlator 22$d$ disabled until a time $2\Delta$ before a next bit transition in the punctual PRN code. In the example, the XOR gate 502 enables the correlator 22$d$ before the bit transitions at times $t_2$, $t_3$, $t_5$ and so forth. It does not, however, enable the correlator at times $t_4$ or $t_6$ since the local PRN code does not make bit transitions at these times.

The correlator 22$d$ responds to the pulses 471–473 that are associated with the bit transition 400 by producing non-zero correlation measurements that correspond to multiplying the I and Q samples of the received signal by +1, −1 and +1, respectively. The correlator 22$d$ is then disabled until shortly before a next bit transition in punctual PRN code. It thus produces no further correlation measurements until time $t_2-2\Delta$. As discussed above, the disabling of the correlator between bit transitions in the local PRN code produces the same result as multiplying the I and Q samples by the zero-valued portions of the early-minus-late blanked PRN code, and accumulating the zero-valued correlation measurements.

The two AND gates 504, 506 may be replaced with a multiplexer (not shown) that selects the E2 signal or an inverted E2 signal, depending on the state of the signal produced by the XOR gate 502.

The minimum width of the pulse 421 or 422 is controlled by the front-end or RF bandwidth of the receiver. The pulses must be wide enough to capture the rising or falling edges of the bit transitions in the received signal. With a wider front-end bandwidth, the edges of the bit transitions rise and fall more sharply. The edges can thus be captured with a pulse of shorter duration. Conversely, with a narrower front end bandwidth and less sharp bit transition edges, pulses of longer duration are required. If the receiver has a front-end bandwidth of 10 MHz, the duration of the pulse 421 or 422 is 0.5 microseconds or one twentieth of a code chip.

Figure 6:
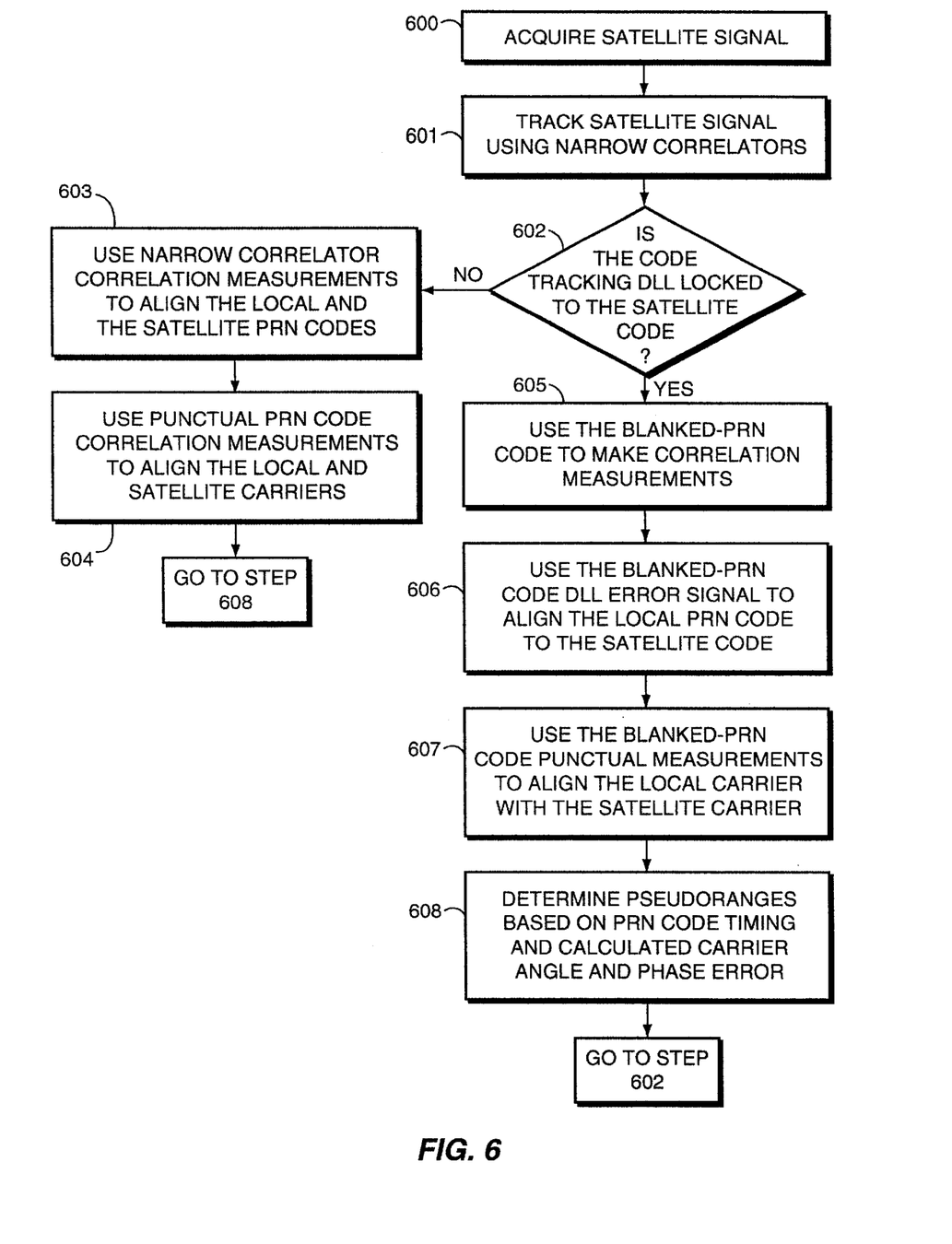
FIG. 6 is a flow chart of the code tracking operations of the GNSS receiver of FIG. 1.

Referring now also to FIG. 6, we discuss the operations of the GNSS receiver 10. The GNSS receiver acquires the satellite signal, and narrows the delay spacing between code-tracking correlators 22$a$–$b$ to track the satellite PRN code using a code-tracking DLL (steps 600–601). When the code tracking DLL is locked to the received PRN code, the GNSS receiver uses the correlation measurements from the blanked-code correlators in a blanked-code DLL, to more closely align the local PRN code with the satellite PRN code (steps 602, 605–606). It also uses the blanked-PRN code punctual correlation measurements to align the local carrier with the satellite carrier (step 607). The receiver at the same time continues to track the received PRN code with the code-tracking correlators, in order to keep the code-tracking DLL locked to the received code. If the code tracking DLL loses code lock, the receiver uses the narrow correlator and punctual PRN code correlation measurements to re-lock to the code in the received signal. While the code tracking DLL is re-locking, the receiver uses these correlation measurements to re-align the local PRN code and carrier with the satellite PRN code and carrier (steps 602–404). Once the code tracking DLL is again locked to the received code, the receiver again uses the blanked-PRN code correlation measurements (steps 602, 605–607).

Using either the PRN code or blanked-PRN code correlation measurements to align the carriers and PRN codes, the receiver determines the pseudoranges, based in part on the timing of the local PRN code, and the calculated carrier phase angle and phase angle tracking error (step 608).

If the GNSS receiver 10 is stationary, it may use the code tracking correlators for both the narrow and the blanked-code correlation. As long as the bit transitions in the received code occur when they are expected—which is at the times of the pulses in the blanked-PRN code—the blanked-code DLL will track the received code. If the transitions in the received code do not occur at the expected times, the DLL will lose code lock and the receiver must re-lock to the received code using the narrow-correlator delay spacing, before it can again make the blanked-code correlation measurements.

The GNSS receiver 10 eliminates from its correlation measurements essentially all contributions from the multipath signals by correlating the received signal with the early, punctual and late version of the blanked-PRN code. The GNSS receiver 10 thus more accurately aligns the local PRN code and carrier with the direct-path code and the carrier in the received signal, and determines more precise pseudoranges based on the more accurate PRN code timing and carrier phase angle information. Since the blanked-code correlation is used only after the receiver is already tracking the received PRN code with the narrow correlators, that is, after the local and the received PRN codes are closely aligned, the delay spacing associated with the blanked-code correlation may be set essentially as narrow as the front-end bandwidth allows.

The foregoing description has been limited to a specific embodiment of this invention. It will be apparent, however, that variations and modifications may be made to the invention, with the attainment of some or all of its advantages Therefore, it is the object of the appended claims to cover all such variations and modifications as come within the true spirit and scope of the invention.

What is claimed is:

1. A GNSS receiver including:
   A. means for acquiring a GNSS satellite signal;
   B. code-tracking correlation means for tracking a PRN code in the GNSS satellite signal and maintaining code lock, the code-tracking correlation means making correlation measurements using early and late versions of a local PRN code;
   C. blanked-code correlation means for making correlation measurements using a blanked-PRN code, to closely align the locally-generated PRN code to the PRN code in the GNSS satellite signal.

2. The GNSS receiver of claim 1 wherein the blanked-code correlation means includes blanked-code generation means for producing the blanked-PRN code, which has non-zero pulses that correspond in time to bit transitions in the locally-generated PRN code and is otherwise zero.

3. The GNSS receiver of claim 1 wherein the blanked-code correlation means makes non-zero correlation measurements at times that correspond to bit transitions in the locally-generated PRN code and zero-valued correlation measurements otherwise.

4. The GNSS receiver of claim 1 wherein the blanked-code correlation means makes correlation measurements at times that correspond to bit transitions in the locally-generated PRN code and refrains from making correlation measurements otherwise.

5. The GNSS receiver of claim 2, wherein the blanked-code generation means produces at each positive bit transition in the locally-generated PRN code a short positive pulse at a time that precedes the bit transition and a short negative pulse at a time that follows the bit transition, with a transition between the positive and negative pulses occurring at the same time as the bit transition in the locally-generated PRN code, and produces pulses of reverse polarity at times that precede follow negative bit transitions in the locally-generated PRN code.

6. The GNSS receiver of claim 2, wherein the blanked-code generation means produces at each negative bit transition in the locally-generated PRN code a short positive pulse at a time that precedes the bit transition and a short negative pulse at a time that follows the bit transition, with a transition between the positive and negative pulses occurring at the same time as the bit transition in the locally-generated PRN code, and produces pulses of reverse polarity at times that precede follow positive bit transitions in the locally-generated PRN code.

7. The GNSS receiver of claim 2, wherein the blanked-code generation means includes:
   a. means for producing a code that transitions from positive to negative at each positive bit transition in the locally-generated PRN code and from negative to positive at each negative bit transition in the locally-generated PRN code; and
   b. means for selectively enabling blanked-code correlators at times that precede the bit transitions in the locally-generated PRN code and disabling the blanked-code correlators at times that follow the bit transitions in the locally-generated PRN code.

8. The GNSS receiver of claim 7 wherein
   c. the blanked-PRN code generation means further includes means for producing an early-minus-late blanked-PRN code, and
   d. the means for selectively enabling the blanked-code correlators further enables an early-minus-late blanked-code correlator at times that precede the bit transitions in the locally-generated PRN code and disables the early-minus-late blanked-code correlator at times that follow the bit transitions in the locally-generated PRN code.

9. The GNSS receiver of claim 8 wherein the blanked-PRN code generation means produces early and late version of the locally-generated PRN code that are closely spaced in time and produces the pulses at the times during which the early and late versions of the locally-generated PRN code differ.

10. The GNSS receiver of claim 9 wherein the blanked-PRN code generation means produces a pulse that precedes the bit transition in the locally-generated PRN code by starting a first pulse at the time the early version of the locally-generated PRN code makes a bit transition and transitioning to a second pulse, which follows the bit transition in the locally-generated PRN code, at the time that the locally-generated PRN code makes the corresponding bit transition.

11. The GNSS receiver of claim 10 wherein the means for selectively enabling the blanked-code correlations enables the correlators at the time that the early version of the locally-generated PRN code makes a bit transition and disables the correlators at the time the late version of the locally-generated PRN code makes a corresponding bit transition.

12. The GNSS receiver of claim 11 wherein the blanked-PRN code generation means further produces earlier and later versions of the locally-generated PRN code that are closely spaced in time and produces the pulses at the times during which the earlier and later versions of the locally-generated PRN code differ.

13. The GNSS receiver of claim 12 wherein the blanked-PRN code generation means produces an early-minus-late blanked-PRN code that includes a first pulse that precedes the bit transition in the locally-generated PRN code, a second pulse that straddles the bit transition in the locally-generated code and a third pulse that follows the bit transition in the locally-generated code, the blanked-PRN code generation means staring the first pulse at the time the earliest version of the locally-generated PRN code makes a bit transition, transitions to the second pulse at the time that the early version of the locally-generated PRN code makes a corresponding bit transition, and transitions to the third pulse at the time of the corresponding bit transition in the late version of the locally-generated PRN code.

14. The GNSS receiver of claim 13 wherein the means for selectively enabling the blanked-code correlations enables an early-minus-late correlator at the time the earliest version of the locally-generated PRN code makes a bit transition and disables the correlators at the time the later version of the locally-generated PRN code makes a corresponding bit transition.

15. A method for tracking a PRN code in a GNSS satellite signal, the method including the steps of:
  A. generating a local PRN code;
  B. aligning the local PRN code to the PRN code in the GNSS satellite signal and maintaining code lock using correlation measurements associated with early and late versions of the local PRN code;
  C. producing a blanked-PRN code from the local PRN code;
  D. further aligning the local PRN code to the PRN code in the satellite signal using correlation measurements associated with the blanked-PRN code.

16. The method of claim 15 wherein
  a. the step of producing the blanked-PRN code includes producing a code that has pulses that precede and follow bit transitions in the local PRN code; and
  b. the step of more closely aligning the local PRN code to the PRN code in the satellite signal includes making non-zero correlation measurements at the times of the pulses in the blanked-PRN code.

17. The method of claim 16 wherein
  c. the step of producing the blanked-PRN code further includes producing an early-minus-late blanked-PRN code that has pulses that precede and follow bit transitions in the local PRN code; and
  b. the step of further aligning the local PRN code to the PRN code in the satellite signal includes making non-zero early-minus rate correlation measurements at the times of the pulses in the early-minus-late blanked-PRN code.

18. The GNSS receiver of claim 8 wherein the blanked-PRN code generation means uses early and late PRN codes that are more closely spaced in time than the early and late PRN codes used by the code tracking correlation means.

19. The GNSS receiver of claim 18 wherein the blanked-PRN code generation means further uses earlier and later versions of the PRN code that are more closely spaced in time than the early and late versions of the PRN code used by the code tracking correlation means, the blanked-PRN code generation means producing pulses at the times during which the earlier and later PRN codes differ.

20. The GNSS receiver of claim 19 wherein the blanked-PRN code generation means produces an early-minus-late blanked-PRN code that includes a first pulse that precedes the bit transition in the local PRN code, a second pulse that straddles the bit transition in the local code and a third pulse that follows the bit transition in the local code, the blanked-PRN code generation means starting the first pulse at the time the earliest version of the local PRN code makes a bit transition, transitions to the second pulse at the time that the early version of the local PRN code makes a corresponding bit transition, and transitions to the third pulse at the time of the corresponding bit transition in the late version of the local PRN code.

21. The GNSS receiver of claim 20 wherein the means for selectively enabling the blanked-code correlators enables an early-minus rate correlator at the time the earliest version of the local PRN code makes a bit transition and disables the correlator at the time the latest version of the local PRN code makes a corresponding bit transition.

* * * * *